(12) United States Patent
Nowakowski et al.

(10) Patent No.: US 7,650,731 B2
(45) Date of Patent: Jan. 26, 2010

(54) BELT TENSIONER FOR COUPON INSERTION APPARATUS

(75) Inventors: Anthony J. Nowakowski, Crystal Lake, IL (US); Jason J. Raasch, Lake Barrington, IL (US)

(73) Assignee: Carol Joyce Witt, Lake Zurich, IL (US)

( * ) Notice: Subject to any disclaimer, the term of this patent is extended or adjusted under 35 U.S.C. 154(b) by 205 days.

(21) Appl. No.: 11/821,961

(22) Filed: Jun. 26, 2007

(65) Prior Publication Data

US 2009/0005203 A1    Jan. 1, 2009

(51) Int. Cl.
B65B 63/00 (2006.01)
B65B 5/10 (2006.01)
B65H 35/10 (2006.01)

(52) U.S. Cl. .............................. 53/520; 53/244; 53/58; 225/100; 225/106

(58) Field of Classification Search .................. 53/435, 53/445, 58, 57, 513, 167, 520, 244; 225/97, 225/100, 101, 106
See application file for complete search history.

(56) References Cited

U.S. PATENT DOCUMENTS

| | | | | |
|---|---|---|---|---|
| 2,513,093 A | * | 6/1950 | Hageman | 225/100 |
| 3,182,876 A | * | 5/1965 | Sedor et al. | 225/101 |
| 3,338,487 A | * | 8/1967 | Schutz | 225/100 |
| 3,425,607 A | * | 2/1969 | Sargent | 225/100 |
| 3,741,451 A | * | 6/1973 | Parenti et al. | 225/100 |
| 4,284,221 A | * | 8/1981 | Nagel et al. | 225/100 |
| 4,413,982 A | | 11/1983 | Foster | |
| 4,498,894 A | * | 2/1985 | Kuckhermann | 493/234 |
| 4,624,359 A | | 11/1986 | Gross | |
| 5,104,022 A | * | 4/1992 | Nakamura et al. | 225/100 |
| 5,261,859 A | | 11/1993 | Deemer et al. | |
| 5,454,206 A | | 10/1995 | Bailer et al. | |
| 5,549,233 A | * | 8/1996 | Clauser | 225/100 |
| 5,784,861 A | | 7/1998 | Kotsiopoulos | |
| 5,785,224 A | * | 7/1998 | Nowakowski | 225/4 |
| 6,082,079 A | * | 7/2000 | Kuehl et al. | 53/520 |
| 6,206,262 B1 | * | 3/2001 | Achelpohl et al. | 225/100 |
| 7,032,774 B2 | * | 4/2006 | Boehm et al. | 221/25 |
| 2004/0149767 A1 | | 8/2004 | Boehm et al. | |

* cited by examiner

*Primary Examiner*—Paul R Durand
(74) *Attorney, Agent, or Firm*—Greer, Burns & Crain, Ltd.

(57) ABSTRACT

A coupon insertion apparatus configured for sequentially inserting coupons into receiving containers, including a machine frame, at least one pair of opposed rollers mounted to the frame and adjustable between a closed position and an open position. A drive system includes a drive belt for simultaneously driving the opposed rollers in both of the positions. A tensioner is connected to the belt and is movable generally transversely to a direction of the adjustment of the drive rollers to maintain a designated tension on the drive belt.

12 Claims, 4 Drawing Sheets

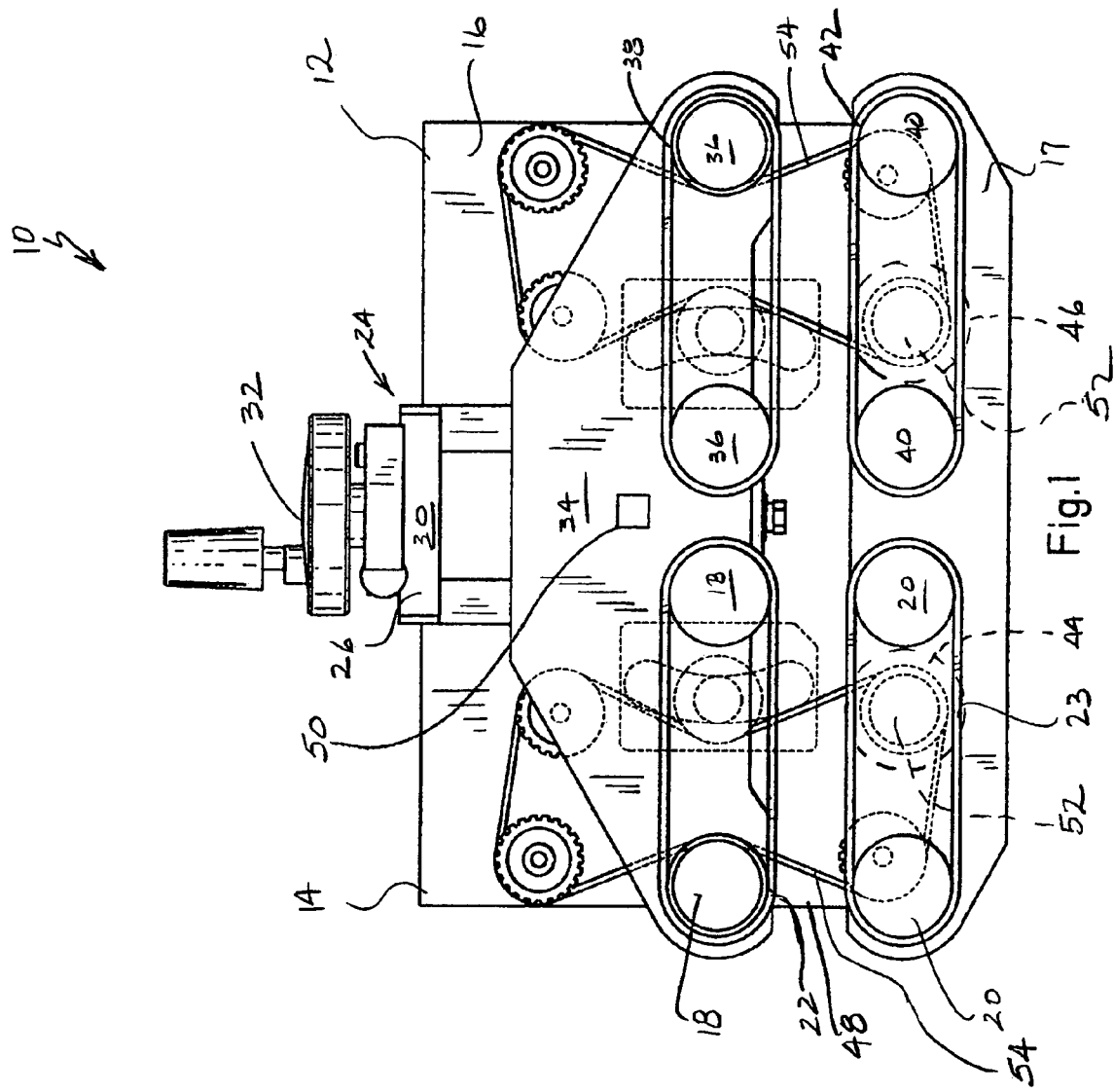

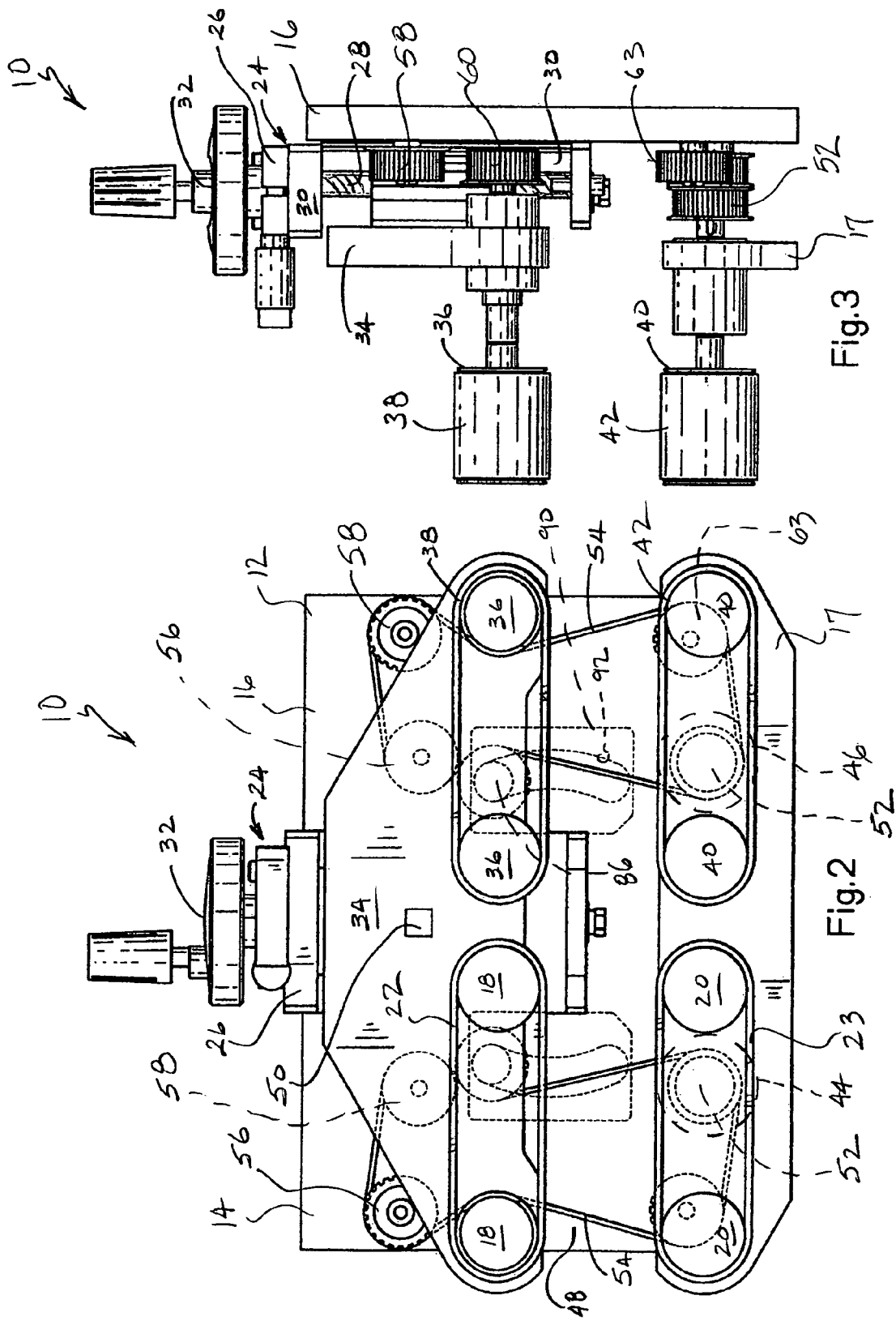

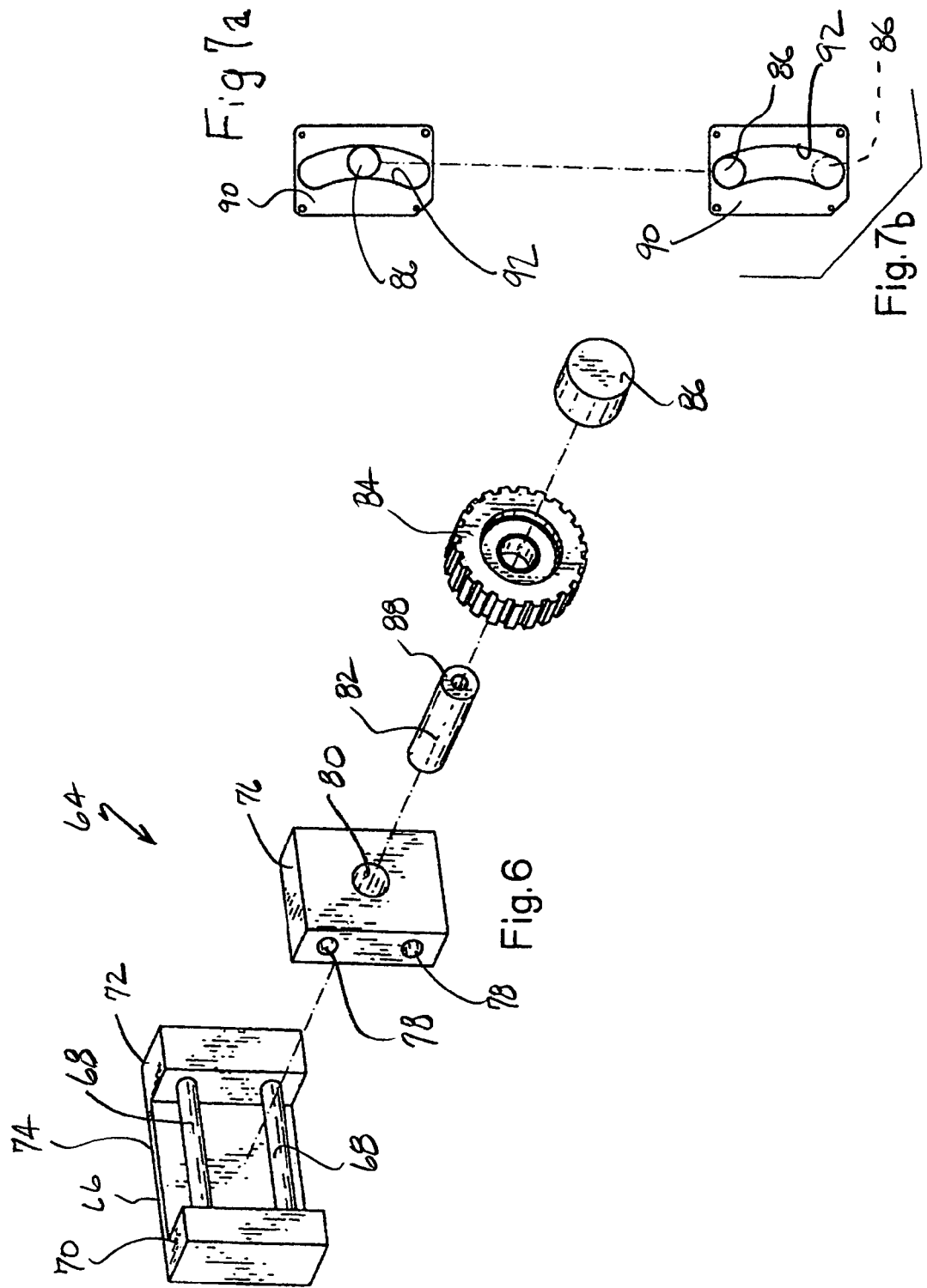

BELT TENSIONER FOR COUPON INSERTION APPARATUS

BACKGROUND OF THE INVENTION

The present invention relates to apparatus for inserting coupons into containers moving along a high volume handling system. Such systems separate the forwardmost coupon from a continuous web and inject the coupon into a container as the container passes a designated location for insertion.

It is a common advertising and promotional technique to place coupons or other leaflets into containers, such as cartons for breakfast cereal or snack items, along with the product to be sold. The consumer may use the coupon for whatever purpose intended, such as for discount or future purchases or a rebate. Many devices have been provided for depositing coupons into containers in the present day packaging industry.

This is just one use for the insertion apparatus described below. However, it should be understood that the word "coupon" is used in its broadest possible sense to include any coupon, card, sheet, receipt, warranty, prize, premium or other part that can advantageously be handled as described hereinafter. Similarly, "container" is used in the broadest possible sense to include containers such as boxes, tubs, cans and vessels of all kinds as well as any other coupon-receiver which can advantageously be used with the present system.

Commonly assigned U.S. Pat. No. 5,784,861, incorporated by reference herein, discloses a coupon insertion device receiving a supply of coupons from a reel and inserting them sequentially into an array of containers. The reel is fed between first and second pairs of opposing rollers. Differential speeds of the first and second pairs of rollers create a tear and burst action on the reel through which the forwardmost coupon is separated from the reel and projected into the container.

While this apparatus is very effective in inserting flat or two-dimensional coupons into containers, there has been a need for similar equipment used for three dimensional coupons having a height or thickness which is significantly greater than conventional flat coupons and/or which are irregular in configuration.

Coupon insertion apparatus have been introduced in which the opposing pairs of rollers are vertically adjustable relative to each other to accommodate coupons of varying sizes and shapes. Such systems typically employ drive belts to power the rollers in the opposing sets. However, a corresponding design issue is maintaining desired control of the drive rollers as the apparatus is adjusted between wide and narrow spacings to accommodate coupons of varying thicknesses.

Conventional coupon insertion apparatus have addressed this problem through the use of spring-loaded pulleys or tensioners for adjusting drive system drive belt tension. However, these systems increase the complexity of the apparatus and the associated manufacturing and repair cost. Also, these systems have been found to increase wear of the drive belts.

Thus, there is a need for an improved coupon insertion apparatus in which variations in the separation between opposing pairs of rollers is achieved in a relatively less complicated and more easily maintained manner. There is also a need for an improved coupon insertion apparatus in which drive belt wear is reduced at the same time movement between closed and open roller positioning is accomplished while maintaining adequate drive belt tension.

BRIEF SUMMARY OF THE INVENTION

The above-listed needs are met or exceeded by the present drive system for a coupon insertion apparatus including upper and lower drive rollers powered by a drive belt. The rollers are adjustable between a closed and an open position for accommodating coupons of varying shapes. A drive belt tensioner is provided which accommodates variation in the spacing of opposing rollers without the use of spring tensioners. A cam follower associated with the drive system and connected to an idler pulley is provided on a laterally slidable carriage and is engaged on the drive belt. A fixed, curved cam track receiving the cam follower is employed to allow separation of the rollers while maintaining belt tension. As the opposing rollers are vertically separated, the cam follows a curved path in the cam track which causes lateral shifting of the pulley in the carriage to adjust belt tension. As the spacing of the opposing rollers changes, the cam follower moves laterally and vertically in the track to maintain tension on the drive belt.

More specifically, a coupon insertion apparatus is configured for sequentially inserting coupons into receiving containers, including a machine frame, at least one pair of opposed rollers mounted to the frame and adjustable between a closed position and an open position. A drive system includes a drive belt for simultaneously driving the opposed rollers in both of the positions. A tensioner is connected to the belt and is movable generally transversely to a direction of the adjustment of the drive rollers to maintain a designated tension on the drive belt.

In another embodiment, a coupon insertion apparatus is configured for sequentially inserting coupons into receiving containers, including a machine frame, at least one pair of opposed rollers mounted to the frame and adjustable between a closed position and at least one open position. A drive system includes a drive belt for simultaneously driving the opposed rollers in both of the positions. A tensioner is connected to the belt and is movable between a first position associated with the closed position and a second position associated with one open position. The tensioner includes a cam follower formation. A guide plate is associated with the frame and defines a track configured for accommodating the cam follower formation between the first and second positions so that the tensioner maintains a specified tension on the drive belt as the rollers move between the open and closed positions.

In yet another embodiment, a tensioner assembly is provided for use in a coupon insertion apparatus having a machine frame and at least one pair of opposed rollers movable between an open and a closed position and being driven by a drive belt, and the apparatus includes a guide plate defining a track configured for accommodating the tensioner assembly. The tensioner assembly includes a bracket having a pair of spaced, parallel rails and defining first and second stops, a carriage linearly slidable on the rails, a shaft disposed on the carriage for common movement, a pulley rotatable on the shaft and configured for engaging the drive belt, a cam follower rotatable on the shaft.

BRIEF DESCRIPTION OF THE SEVERAL VIEWS OF THE DRAWINGS

FIG. 1 is a front view of the present coupon insertion apparatus provided with the present belt tensioning apparatus shown in a partially open position;

FIG. 2 is a front view of the present coupon insertion apparatus provided with the present belt tensioning apparatus shown in a fully open position;

FIG. 3 is a side view of the apparatus of FIG. 1;

FIG. 6 is an exploded perspective view of the cam follower apparatus of FIG. 4;

FIG. 7a is a schematic fragmentary elevation of a guide plate shown with the apparatus of FIG. 1 in a partially open position; and FIG. 7b is a schematic fragmentary elevation of the guide plate shown with the apparatus of FIG. 1 in fully closed and open positions.

DETAILED DESCRIPTION OF THE INVENTION

Figure 4:
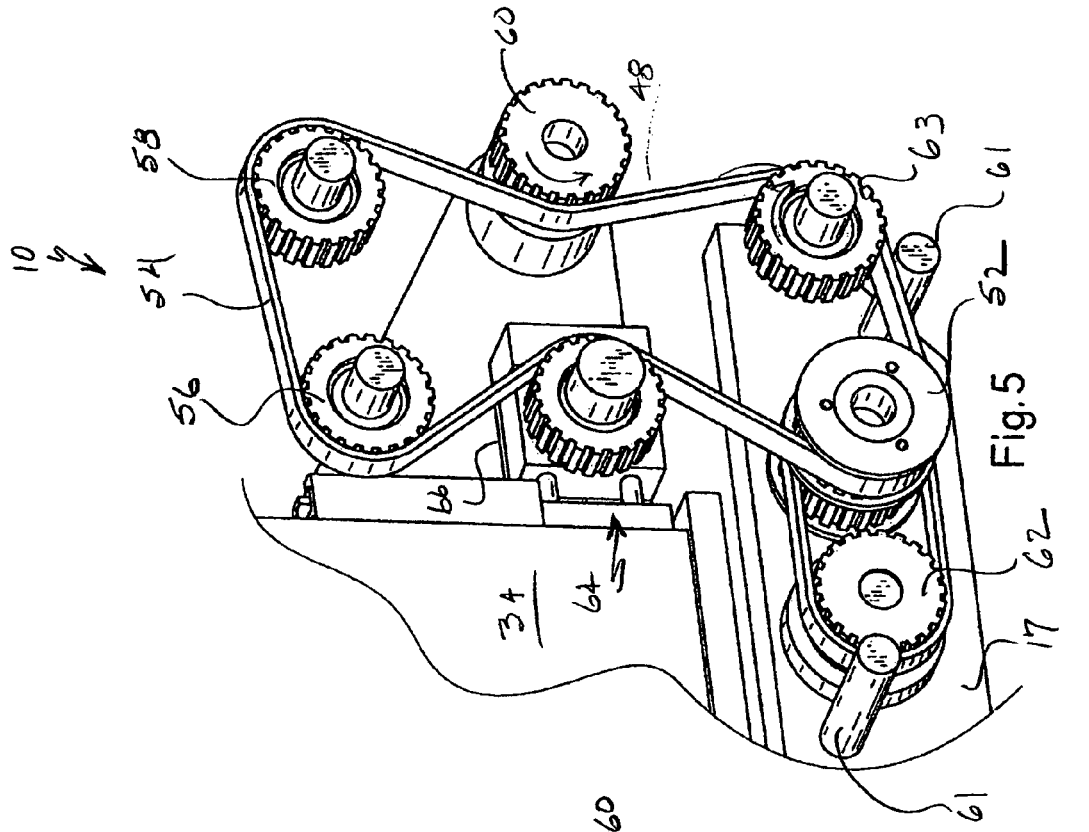
FIG. 4 is a fragmentary assembled view of the coupon insertion apparatus of FIG. 1 showing the drive system in a first position where the drive rolls are in close proximity to each other.

Generally, the present coupon insertion apparatus receives a continuous web of separatable coupons, pulls the forwardmost coupon away from the continuous web, and dispenses the coupon at a predetermined time into a rapidly moving container as it passes a predetermined location. The present coupon insertion apparatus is intended to be integrated into a full service container processing system, and will supply coupons into the containers at a location at which the containers have been formed, usually have not yet been filled and have not yet been closed. An exemplary conventional coupon insertion apparatus is described in greater detail in commonly assigned U.S. Pat. No. 5,784,861, incorporated by reference.

Referring now to FIGS. 1-3, a coupon insertion apparatus is generally designated 10 and is shown in a front view. Prior to operation, the apparatus 10 is located relative to a container conveyor line to accurately sequentially dispense or project coupons into passing containers. As is customary in the art, the apparatus 10 is commonly referred to as having a left side 12 and a right side 14, which are opposite to the views as seen in FIG. 1. While the apparatus 10 can be fed a supply of coupons from either direction, for purposes of the present explanation it will be assumed that the coupons are being fed from the left side 12 and are projected from the right side 14 into the container (not shown).

The apparatus 10 includes a machine frame 16 which remains stationary during coupon insertion, and to which are mounted a drive frame 17 and a plurality of opposed upper and lower positioning rollers 18 and 20, each plurality of rollers being surrounded by a respective suitable endless conveyor belt 22, 23. The belts 22, 23 are preferably made of a resilient, rubber or rubber-like material with enhanced coupon gripping properties to facilitate the movement of coupons through the apparatus 10.

Figure 5:
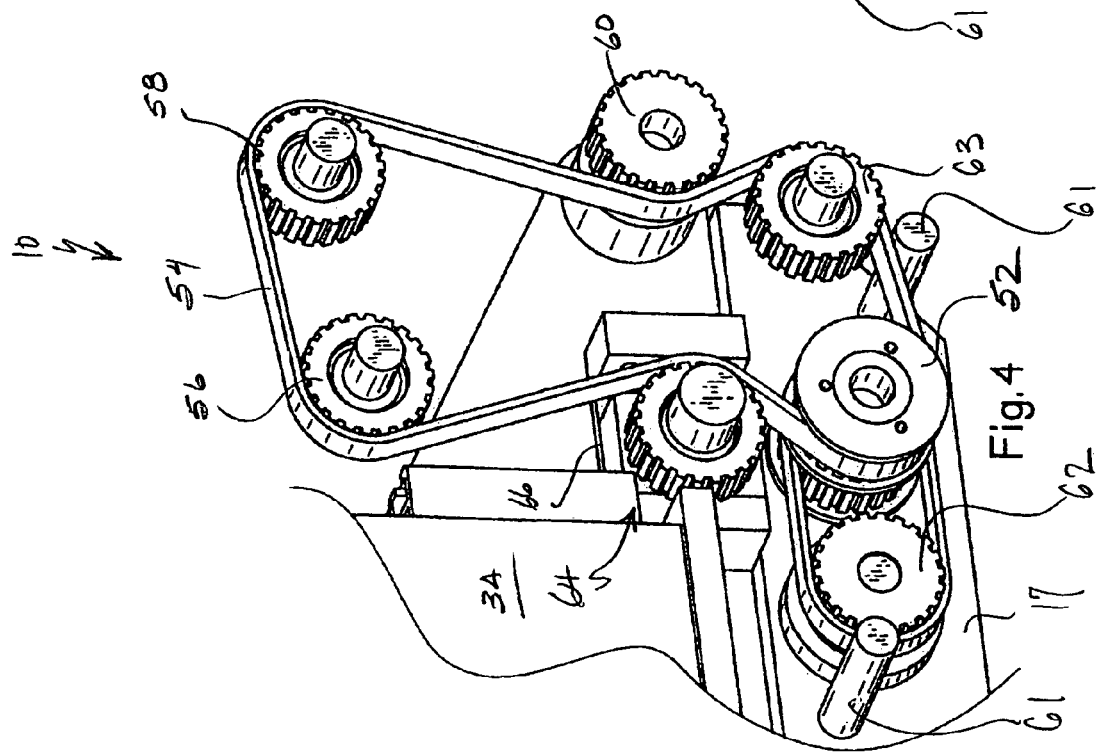
FIG. 5 is a fragmentary assembled view of the coupon insertion apparatus of FIG. 1 showing the drive system in a second position where the drive rolls are in a partially separated relationship to each other.

While the lower positioning rollers 20 are positioned on the drive frame 17 at a fixed location, the upper positioning rollers 18 are vertically movable between a closed position (FIG. 4), and a totally open position (FIG. 2), with a semi or partial open position also available (FIGS. 1 and 5). It will be understood that the distance or displacement between the upper and lower rollers 18, 20 is determined by the user and is a function of the configuration of the coupon. In the preferred embodiment, there is an approximate 2 inch gap between the closed and open positions; however it will be understood that this dimension may vary to suit the application. Generally flat or planar coupons will require the apparatus to be adjusted to the closed position, while three dimensional inserts such as small plastic toys or other prizes may require the fully open position, depending on their size.

The vertical adjustment of the upper rollers 18 is accomplished through the use of a linear slide 24 which includes a main support block 26 secured to the machine frame 16. A captured, rotatable threaded rod 28 (FIG. 3) is axially rotatable in a support bracket 30 through suitable bearings (not shown) and is rotated using a crank 32. Other conventional rotation technologies, including motorized rotation, are contemplated. The upper rollers 18 are secured to a movable block 34, also referred to as the moving frame, having a portion threadably engaged on the threaded rod 28 so that rotation of the rod causes the block 34, and with it the upper rollers 18, to move incrementally vertically relative to the lower rollers 20. Thus, while three basic positions have been described, depending on the amount of rotation of the crank 32, there are many possible distances between the upper and lower positioning rollers 18, 20 to provide for accommodation of a variety of coupons.

In the preferred coupon insertion apparatus 10, there are two sets of upper rollers, the upper positioning rollers 18, and a plurality of upper feed rollers 36, also provided with a corresponding endless conveyor belt 38. The upper feed rollers 36 oppose a corresponding set of lower feed rollers 40, also provided with a corresponding conveyor belt 42. The belts 22, 23, 38 and 42 are preferably of similar construction. It will be understood that the feed rollers 36, 40 are duplicates of the positioning rollers 18, 20, and as such the following description of the positioning rollers will apply to the feed rollers as well.

The feed rollers 36, 40 are so named due to their receiving the coupons from the feed roll or bandolier, depending on the particular coupon, and passing the coupons to the positioning rollers 18, 20, which ultimately transmit or project the coupons into the waiting container. However, as discussed above, the apparatus 10 is usable in either direction, so that the feed rollers 36, 40 can become the positioning rollers 18, 20.

During bursting, the positioning rollers 18, 20 are driven at a predetermined rotational speed by a drive source 44 such as a servo drive motor. A stepper motor may also be used, resulting in lower cost. Similarly, the feed rollers 36, 40 are stopped. The feed rollers 36, 40 draw a web of coupons toward a bight 48 formed by the positioning rollers 18, 20.

At a predetermined time, the positioning rolls 18, 20 tear the forwardmost coupon from the next succeeding coupon along the perforated line of separation and inject forwardmost coupon at a predetermined location. The feed rollers 36, 40 then cause the leading edge of the forwardmost coupon to enter the bight 48 between positioning rolls 18, 20. At least one photoelectric coupon sensor 50 is provided in operational relationship to the rollers 18, 20 and 36, 40 to provide an electronic controller (not shown) with sensed coupon location information. The location of the sensor 50 may vary to suit the application. As is known in the art, and described in greater detail in U.S. Pat. No. 5,784,861, variations in the speeds of the motors 44, 46 cause coupons to be sequentially separated from the web of coupons and projected at high speed into a designated container. The control of the operation of the apparatus 10 is considered outside the scope of the present belt tensioner and is not repeated here.

Referring now to FIGS. 4 and 5, which depict the present apparatus 10 as seen behind the movable block 34 and the drive frame 17 in the preferred embodiment, only one drive roller 52 is provided to each of the sets of opposed rollers 18, 20 and 36, 40, and transmits power to the rollers via a drive belt 54. A design factor of conventional coupon insertion devices is that the drive belt 54 must be maintained at a specified or predetermined tension for proper operation of the apparatus 10. This specified tension needs to be maintained regardless of whether the apparatus 10 is in the closed position or the open position. Conventional coupon insertion apparatus employed spring-biased belt tensioners which have been found to have sufficient drawbacks to require a replacement technology.

Referring now to FIGS. 4 and 5, the roller drive system is shown in greater detail. The drive roller 52 is driven by one of the servo motors 44, 46 and is toothed to drive the preferably similarly constructed drive belt 54. While a belt 54 is preferred, other power transmission systems are contemplated, including but not limited to linked chains. A pair of preferably toothed upper idler rollers 56, 58 is fixed to the machine frame 16. An upper, preferably toothed conveyor drive roller 60 directly moves the corresponding upper conveyor belt 22. At least one and preferably three standoffs 61 are provided for maintaining a desired spacing between the roller drive system and the drive frame 17 as well as the movable block 34. A lower, preferably toothed conveyor drive roller 62 drives the lower conveyor belt 23, and is accompanied by a lower idler roller 63. While the rollers 60, 62 are designated drive rollers, they are actually idlers in that they are powered by the drive belt 54 through the drive roller 52 and are not independently driven. It will be seen that the rollers 60, 62 are disposed relative to the drive belt 54 so that they are rotated in opposite directions. However, this arrangement is needed so that the upper and lower belts 22, 23 can cooperate to convey a coupon in the desired direction.

Referring now to FIGS. 4-6, a belt tensioner, generally designated 64 is preferably mounted to the movable block 22, however may alternately be mounted to the machine frame 16, and exerts a desired tension on the drive belt 54 regardless of the displacement of the upper positioning rolls 18 to the lower positioning rolls 20. Unlike prior systems, this tensioning is exerted without the use of springs. The tensioner 64 accommodates movement of the upper rollers 18 relative to the lower rollers 20 by movement generally transverse to the movement of the rollers relative to each other.

Included on the belt tensioner 64 is a bracket 66 having a pair of spaced, parallel rails 68 and defining first and second stops 70, 72. The stops 70, 72 are joined by a rear wall 74 so that the bracket 66 is generally "["-shaped when viewed from above. A block-like carriage 76 has a pair of parallel through-bores 78 dimensioned to form linear bearings and slidably engage the rails 68. Thus, the carriage 76 is linearly slidable along the rails 68 between the first and second stops 70, 72 in a direction transverse to the direction of movement of the movable block 34 along the threaded rod 28.

Generally centrally located on the carriage 76 is a shaft bore 80 into which is inserted a shaft 82 for secure attachment. A toothed pulley 84 is rotatable about the shaft 82, and a cam follower 86 is rotatably mounted to a tip 88 of the shaft 82. Upon assembly, the cam follower 86, the pulley 84 and the shaft 82 are all laterally slidable as a unit upon the carriage 76 relative to the bracket 66 between a first position against the stop 70 (FIG. 4) and a second position against the stop 72 (FIG. 5).

Referring now to FIGS. 1 and 7, a guide plate 90 is disposed on the machine frame 16, however if the tensioner 64 is placed on the machine frame, the guide plate is mounted to the movable block 34. The guide plate 90 defines a curved or arcuate track 92 dimensioned to slidably accommodate edges of the cam follower 86. With the curved shape, as the upper positioning rollers 18 move vertically, the curved track 92 causes the cam follower 86 to move laterally on the rails 68. Also, the track 92 is sufficiently long to accommodate the travel of the upper positioning rollers 18 relative to the lower positioning rollers 20 between the closed position and the open position so that the tensioner 64 maintains a designated tension on the drive belt 54 as the rollers 18 move between the positions.

Referring now to FIG. 7a, the cam follower 86 is shown mid-way in the track 92, which represents its position approximately mid-way between the fully closed and fully open positions. This position, also depicted in FIGS. 2 and 5, represents the greatest displacement of the drive belt 54 by the tensioner 64. Referring now to FIG. 7b, the cam follower 86 is shown in the fully open position at the top of the track 92, and in the fully closed position at the bottom of the track.

Thus, it will be seen that the present coupon insertion apparatus 10 provided with the belt tensioner 64 provides for more efficient operation of the apparatus, in that constant, predetermined tension is maintained on the drive belt 54 as the upper frame 34 is moved relative to the machine frame 16 to accommodate various sizes of coupons. The cam follower 86 moves laterally in the bracket 66 to accommodate various positions of the upper frame.

While a particular embodiment of the present coupon insertion apparatus has been described herein, it will be appreciated by those skilled in the art that changes and modifications may be made thereto without departing from the invention in its broader aspects and as set forth in the following claims.

The invention claimed is:

1. A coupon insertion apparatus configured for sequentially inserting coupons into receiving containers, comprising:
    a machine frame;
    at least one pair of opposed rollers mounted to said frame and being adjustable between a closed position and an open position;
    a drive system including a drive belt for simultaneously driving said opposed rollers in both of said positions; and
    a tensioner connected to said belt and movable generally transversely to a direction of said adjustment of said drive rollers to maintain a designated tension on said drive belt, said tensioner including a cam follower configured to be slidable laterally as said rollers move vertically between said open and closed positions.

2. The apparatus of claim 1 further comprising a guide plate defining a track configured for accommodating said cam follower between said open and closed positions so that said tensioner maintains said designated tension on said drive belt as said rollers move between said positions.

3. The apparatus of claim 2 wherein said track has an actuate shape for causing said cam follower to move laterally as said rollers move between said positions.

4. The apparatus of claim 1 wherein said cam follower includes a pulley for engaging said drive belt.

5. The apparatus of claim 4 wherein said drive belt is disposed on said frame to drive said first and second rollers in opposite directions.

6. The apparatus of claim 1 wherein said at least one pair of rollers include opposed pluralities of feed rollers and opposed pluralities of positioning rollers, associated members of said pluralities driving conveyor belts for defining said open and closed positions.

7. The apparatus of claim 1 wherein said tensioner exerts tension on said drive belt without the use of springs.

8. A coupon insertion apparatus configured for sequentially inserting coupons into receiving containers, comprising:
   a machine frame;
   at least one pair of opposed rollers mounted to said frame and adjustable between a closed position and at least one open position;
   a drive system including a drive belt for simultaneously driving said opposed rollers in both of said positions;
   a tensioner connected to said belt and movable between a first position associated with said closed position and a second position associated with one said open position, said tensioner including a cam follower formation; said cam follower secured to a carriage defining lateral movement of said cam follower, said carriage being associated with said machine frame; and
   a guide plate defining a tack configured for accommodating said cam follower formation between said first and second positions so that said tensioner maintains a specified tension on said drive belt as said rollers move between said positions.

9. The apparatus of claim 8 further including an upper frame associated with said machine frame and associated with one of said rollers, said upper frame moving relative to said machine frame as said rollers move between said open and closed positions, said carriage being located on said upper frame.

10. The apparatus of claim 8 further including a bracket having a pair of spaced, parallel rails for accommodating said sliding movement of said carriage, and including first and second stops defining limits of travel of said carriage.

11. A tensioner assembly for use in a coupon insertion apparatus having a machine frame and at least one pair of opposed rollers movable between an open and a closed position and being driven by a drive belt, said apparatus including a guide plate defining a track configured for accommodating said tensioner assembly, said tensioner assembly comprising:
   a bracket having a pair of spaced, parallel rails and defining first and second stops;
   a carriage linearly slidable on said rails;
   a shaft disposed on said carriage for common movement;
   a pulley rotatable on said shaft and configured for engaging said drive belt; and
   a cam follower rotatable on said shaft.

12. The tensioner of claim 11 wherein said cam follower is constructed and arranged to be slidingly accommodated in said track.

* * * * *